US012328394B2

(12) United States Patent
Albero et al.

(10) Patent No.: US 12,328,394 B2
(45) Date of Patent: Jun. 10, 2025

(54) SYSTEM FOR AUGMENTED HASH-BASED PORTIONING OF NON-FUNGIBLE ELECTRONIC RESOURCES FOR DETECTION OF UNAUTHORIZED DUPLICATES

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 243 days.

(21) Appl. No.: 17/834,038

(22) Filed: Jun. 7, 2022

(65) Prior Publication Data
US 2023/0396437 A1 Dec. 7, 2023

(51) Int. Cl.
*H04L 9/32* (2006.01)
*G06F 21/10* (2013.01)

(52) U.S. Cl.
CPC ............ *H04L 9/3213* (2013.01); *G06F 21/10* (2013.01); *H04L 9/3239* (2013.01); *G06F 21/101* (2023.08)

(58) Field of Classification Search
CPC ....... H04L 9/3213; H04L 9/3239; H04L 9/50; G06F 21/10; G06F 21/101
See application file for complete search history.

(56) References Cited

U.S. PATENT DOCUMENTS

| 10,715,326 | B2 | 7/2020 | Maim |
| 10,938,835 | B2 | 3/2021 | Oberhauser |
| 11,194,961 | B2 | 12/2021 | Wang |
| 11,451,530 | B2 | 9/2022 | Padmanabhan |
| 11,461,437 | B1* | 10/2022 | LaMontagne ........... G06F 21/64 |
| 11,611,560 | B2 | 3/2023 | Padmanabhan |
| 11,949,795 | B2* | 4/2024 | Young .................... H04L 9/3247 |
| 11,977,530 | B2* | 5/2024 | Soon-Shiong ........... G06F 16/24 |
| 12,073,399 | B2* | 8/2024 | Lee ........................ H04L 67/566 |
| 2013/0219397 | A1* | 8/2013 | Adams ................... G06F 9/5027 707/705 |
| 2017/0300876 | A1 | 10/2017 | Musiala, Jr. |
| 2017/0337534 | A1 | 11/2017 | Goeringer |
| 2017/0344988 | A1 | 11/2017 | Cusden |

(Continued)

*Primary Examiner* — Abu S Sholeman
(74) *Attorney, Agent, or Firm* — Moore & Van Allen PLLC; Anup Iyer (57) ABSTRACT

Systems, computer program products, and methods are described herein for augmented hash-based portioning of non-fungible electronic resources for detection of unauthorized duplicates. The present invention is configured to receive an unauthorized duplication detection request for a first NFT from a first user; segment the first digital resource into a first set of resource portions; generate a first set of hash values corresponding to the first set of resource portions; retrieve a second digital resource, wherein the second digital resource is associated with a second NFT; segment the second digital resource into a second set of resource portions; generate a second set of hash values corresponding to the second set of resource portions; determine that the second digital resource is similar to the first digital resource; determine that the second NFT is an unauthorized duplication of the first NFT; and trigger one or more responsive actions.

20 Claims, 6 Drawing Sheets

(56) References Cited

U.S. PATENT DOCUMENTS

| | | |
|---|---|---|
| 2019/0173854 A1 | 6/2019 | Beck |
| 2019/0236559 A1 | 8/2019 | Padmanabhan |
| 2019/0236562 A1 | 8/2019 | Padmanabhan |
| 2019/0236606 A1 | 8/2019 | Padmanabhan |
| 2019/0238316 A1 | 8/2019 | Padmanabhan |
| 2020/0119906 A1 | 4/2020 | Das |
| 2020/0134656 A1 | 4/2020 | Padmanabhan |
| 2020/0242595 A1 | 7/2020 | Harrison |
| 2020/0250747 A1 | 8/2020 | Padmanabhan |
| 2021/0182423 A1 | 6/2021 | Padmanabhan |
| 2021/0226774 A1 | 7/2021 | Padmanabhan |
| 2022/0271915 A1 | 8/2022 | Turner |
| 2023/0043095 A1* | 2/2023 | Milam ................. H04L 9/30 |
| 2023/0196656 A1* | 6/2023 | Bramlet ............ G06Q 20/1235 |
| 2023/0401565 A1* | 12/2023 | Smith ................ G06Q 20/367 |

* cited by examiner

SYSTEM FOR AUGMENTED HASH-BASED PORTIONING OF NON-FUNGIBLE ELECTRONIC RESOURCES FOR DETECTION OF UNAUTHORIZED DUPLICATES

FIELD OF THE INVENTION

The present invention embraces a system for augmented hash-based portioning of non-fungible electronic resources for detection of unauthorized duplicates.

BACKGROUND

An NFT is a digital unit of data used as a unique digital identifier for a resource. An NFT is typically stored on a distributed ledger that certifies ownership and authenticity of the resource. There is a constant need in the industry to monitor the authenticity of the NFT.

Therefore, there is a need for an augmented hash-based portioning of non-fungible electronic resources for detection of unauthorized duplicates.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for augmented hash-based portioning of non-fungible electronic resources for detection of unauthorized duplicates is presented. The system comprising: at least one non-transitory storage device; and at least one processor coupled to the at least one non-transitory storage device, wherein the at least one processor is configured to: receive, from a first user input device, an unauthorized duplication detection request for a first non-fungible token (NFT) from a first user, wherein the first NFT is associated with a first digital resource, wherein the first user is an owner of the first NFT; segment, using a resource segmentation engine, the first digital resource into a first set of resource portions; generate a first set of hash values corresponding to the first set of resource portions; retrieve, from a virtual environment, a second digital resource, wherein the second digital resource is associated with a second NFT; segment, using the resource segmentation engine, the second digital resource into a second set of resource portions; generate a second set of hash values corresponding to the second set of resource portions; determine that the second digital resource is similar to the first digital resource based on at least the first set of hash values and the second set of hash values; determine that the second NFT is an unauthorized duplication of the first NFT; and trigger one or more responsive actions for execution in response to determining that the second NFT is an unauthorized duplication of the first NFT.

In some embodiments, segmenting the first digital resource further comprises: overlaying, using the resource segmentation engine, a first bounding segment pattern on the first digital resource; and generating the first set of resource portions for the first digital resource based on at least overlaying the first bounding segment pattern on the first digital resource.

In some embodiments, segmenting the second digital resource further comprises: overlaying, using the resource segmentation engine, the first bounding segment pattern on the second digital resource the one or more predetermined bounding segments on the second digital resource; and generating the second set of resource portions for the second digital resource based on at least overlaying the first bounding segment pattern on the second digital resource.

In some embodiments, determining that the second digital resource is similar to the first digital resource further comprises: comparing the first set of hash values and the second set of hash values; determining a match between the first set of hash values and the second set of hash values; and determining that the second digital resource is similar to the first digital resource.

In some embodiments, determining that the second NFT is the unauthorized duplication of the first NFT further comprises: determine one or more conditional requirements associated with a minting of the first NFT; determining that the second NFT does not meet the one or more conditional requirements; and determining that the second NFT is the unauthorized duplication of the first NFT based on at least determining that the second NFT does not meet the one or more conditional requirements.

In some embodiments, triggering the one or more responsive actions for execution further comprises generating an alert notification, wherein the alert notification comprises an indication that the second NFT is the unauthorized duplication of the first NFT.

In some embodiments, the at least one processor is further configured to: transmit control signals configured to cause the first user input device to display the alert notification.

In some embodiments, the at least one processor is further configured to: retrieve, from a relationship layer of the second NFT, ownership information associated with the second NFT; determine, from the ownership information, that a second user is an owner of the second NFT, wherein the second user is associated with a second user input device; and transmit control signals configured to cause the second user input device to display the alert notification.

In some embodiments, the at least one processor is further configured to: transmit control signals configured to cause a user input device associated with an administrator of the virtual environment to display the alert notification.

In another aspect, a computer program product for augmented hash-based portioning of non-fungible electronic resources for detection of unauthorized duplicates is presented. The computer program product comprising a non-transitory computer-readable medium comprising code causing an apparatus to: receive, from a first user input device, an unauthorized duplication detection request for a first non-fungible token (NFT) from a first user, wherein the first NFT is associated with a first digital resource, wherein the first user is an owner of the first NFT; segment, using a resource segmentation engine, the first digital resource into a first set of resource portions; generate a first set of hash values corresponding to the first set of resource portions; retrieve, from a virtual environment, a second digital resource, wherein the second digital resource is associated with a second NFT; segment, using the resource segmentation engine, the second digital resource into a second set of resource portions; generate a second set of hash values corresponding to the second set of resource portions; determine that the second digital resource is similar to the first digital resource based on at least the first set of hash values and the second set of hash values; determine that the second NFT is an unauthorized duplication of the first NFT; and trigger one or more responsive actions for execution in response to determining that the second NFT is an unauthorized duplication of the first NFT.

In yet another aspect, a method for augmented hash-based portioning of non-fungible electronic resources for detection of unauthorized duplicates is presented. The method comprising: receiving, from a first user input device, an unauthorized duplication detection request for a first non-fungible token (NFT) from a first user, wherein the first NFT is associated with a first digital resource, wherein the first user is an owner of the first NFT; segmenting, using a resource segmentation engine, the first digital resource into a first set of resource portions; generating a first set of hash values corresponding to the first set of resource portions; retrieving, from a virtual environment, a second digital resource, wherein the second digital resource is associated with a second NFT; segmenting, using the resource segmentation engine, the second digital resource into a second set of resource portions; generating a second set of hash values corresponding to the second set of resource portions; determining that the second digital resource is similar to the first digital resource based on at least the first set of hash values and the second set of hash values; determining that the second NFT is an unauthorized duplication of the first NFT; and triggering one or more responsive actions for execution in response to determining that the second NFT is an unauthorized duplication of the first NFT.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Demand for an NFT is often directly proportional to its perceived scarcity. Unique artworks from renowned illustrators might make good examples of rare NFTs as will the tokens minted by top-grade celebrities. The rarity factor brings in plenty of intrinsic value to these NFTs. Often, buyers purchase NFTs based on such rarity factors. For example, the seller may guarantee that only one NFT has ever been minted for a particular digital resource. The buyer may purchase the NFT for that digital resource basing their decision-making on the seller's guaranteed condition. However, it is not uncommon for sellers to violate their guarantee and mint additional NFTs for sale with same or similar guarantees. In many cases, astute sellers often change the smallest addressable element of the digital resource, thus altering its hash value from being detected, while maintaining its overall aesthetic nature. Thus, hash-value based duplicate detection techniques often fail to detect such duplicates as their overall hash value is different.

Accordingly, the present invention, (i) receives, from a first user input device, an unauthorized duplication detection request for a first non-fungible token (NFT) from a first user. The first NFT is associated with a first digital resource, and the first user may be an owner of the first NFT, (ii) segments, using a resource segmentation engine, the first digital resource into a first set of resource portions. Overlays, using the resource segmentation engine, a first bounding segment pattern on the first digital resource. Bounding segments may be used to divide the digital resource into multiple portions. Each bounding segment may be configured to circumscribe the digital resource within a predetermined boundary prescribed by that bounding segment. A bounding segment pattern may be a specific combination of bounding segments that is used to partition the digital resource. The pattern may be established based not only on the combination of various shapes and sizes of the bounding segments used, but also on each bounding segment's location on the digital resource, (iii) generates a first set of hash values corresponding to the first set of resource portions. For each portion, the system may be configured to generate a hash value, (iv) retrieves, from a virtual environment, a second digital resource, wherein the second digital resource is associated with a second NFT. The second digital resource may have the same type as that of the first digital resource (e.g., if the first digital resource is digital art, the second digital resource is also digital art), (v) segments, using the resource segmentation engine, the second digital resource into a second set of resource portions. The same bounding segment pattern used on the first digital resource is also used on the second digital resource (and all other digital resources in the virtual environment analyzed for duplicates), (vi) generates a second set of hash values corresponding to the second set of resource portions, (vii) determines that the second digital resource is similar to the first digital resource based on at least the first set of hash values and the second set of hash values, (viii) determines that the second NFT is an unauthorized duplication of the first NFT. Determines one or more conditional requirements associated with the minting of the first NFT. For example, one of the conditional requirements offered by the seller indicates that only one NFT is going to be minted for a particular digital resource. Thus, when the second digital resource is determined to be similar to that of the first digital resource, it is an indication that a conditional requirement associated with the minting of the first NFT has been violated by the existence of the second NFT, and (ix) triggers one or more responsive actions for execution in response to determining that the second NFT is an unauthorized duplication of the first NFT. Generates an alert notification indicating that the second NFT is the unauthorized duplication of the first NFT. Transmits the alert notification to the owner of the first NFT, the owner of the second NFT, and the administrator of the virtual environment where the second NFT resides.

What is more, the present invention provides a technical solution to a technical problem. As described herein, the technical problem includes unauthorized detection of duplicates using augmented hash techniques. In particular, present invention is an improvement over existing solutions by providing a more accurate solution to problem, thus reducing the number of resources required to remedy any errors made due to a less accurate solution. Also, the present invention removes manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
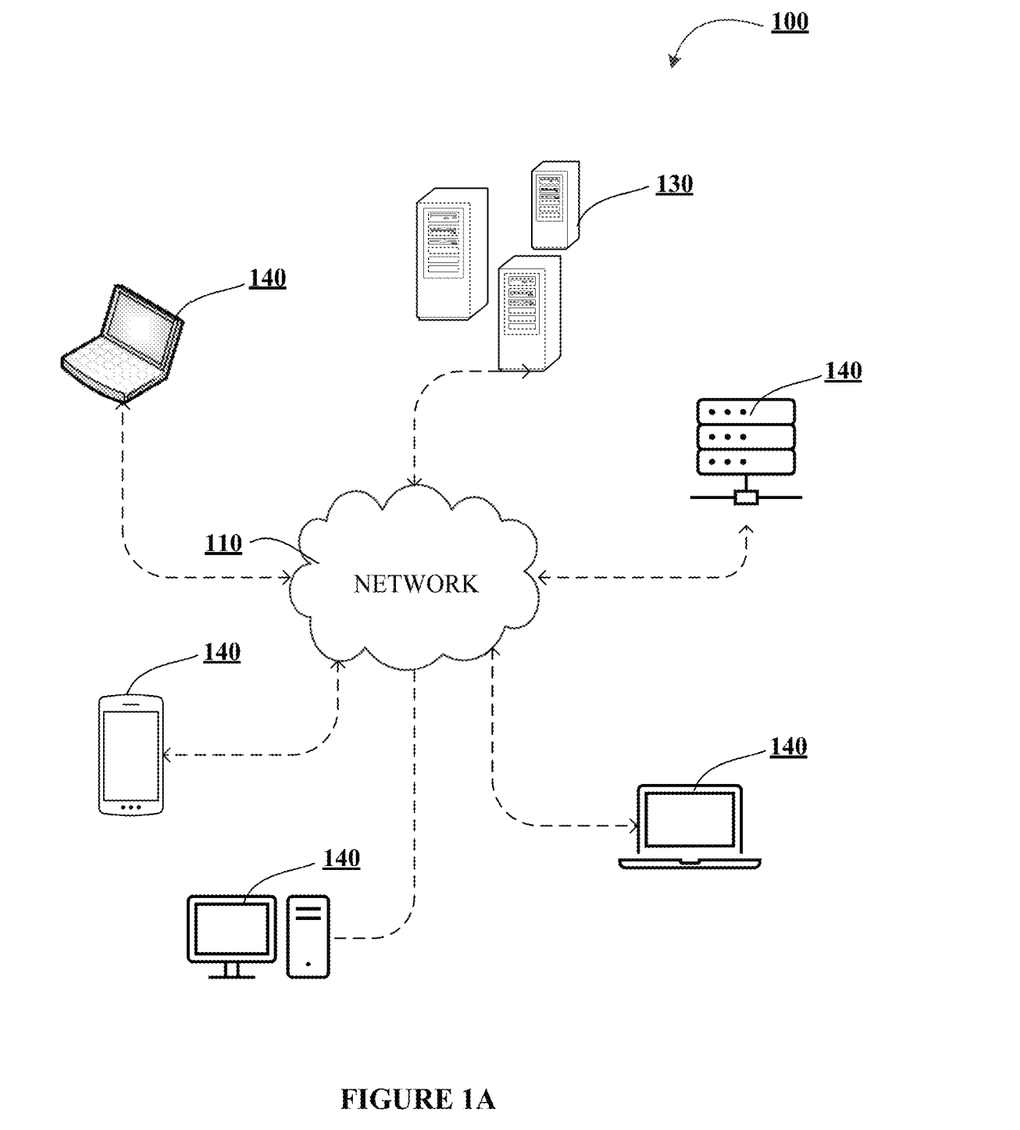
FIGS. 1A-1C illustrates technical components of an exemplary distributed computing environment for augmented hash-based portioning of non-fungible electronic resources for detection of unauthorized duplicates, in accordance with an embodiment of the invention.
Figure 1B:
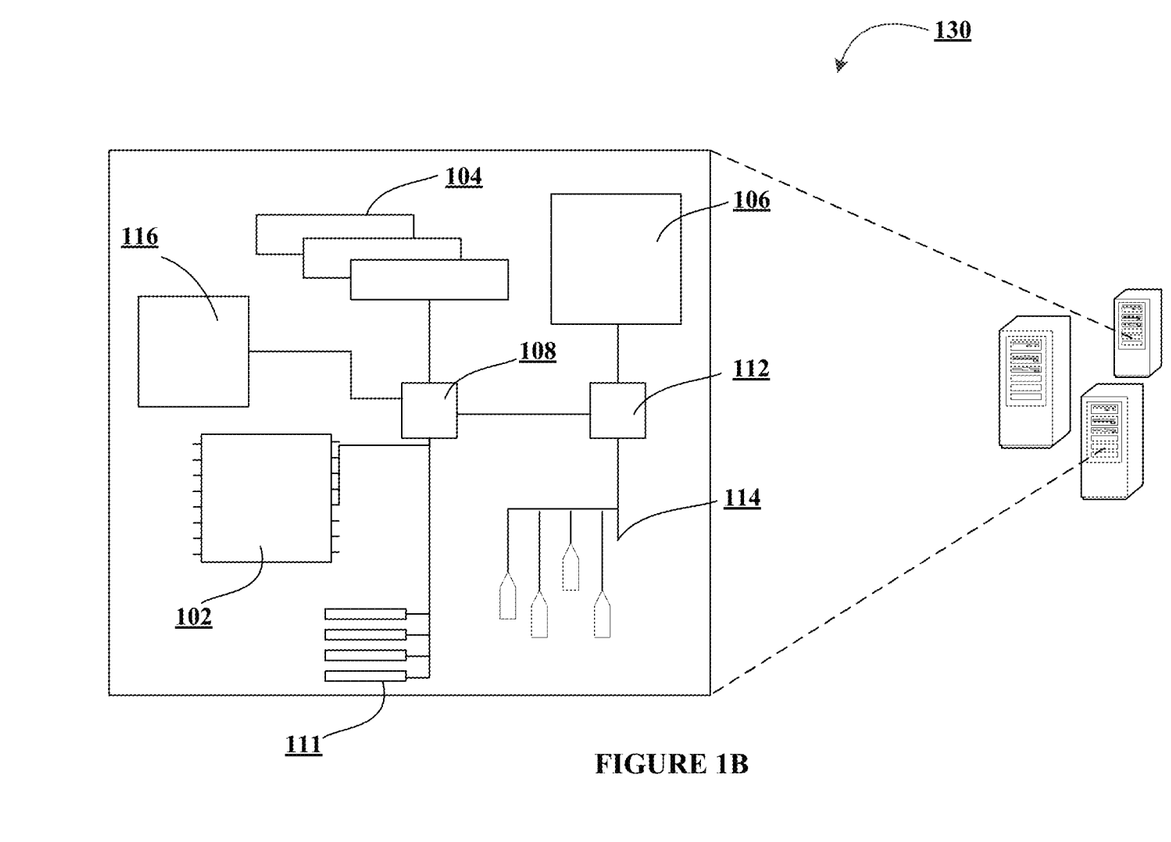
Figure 1C:
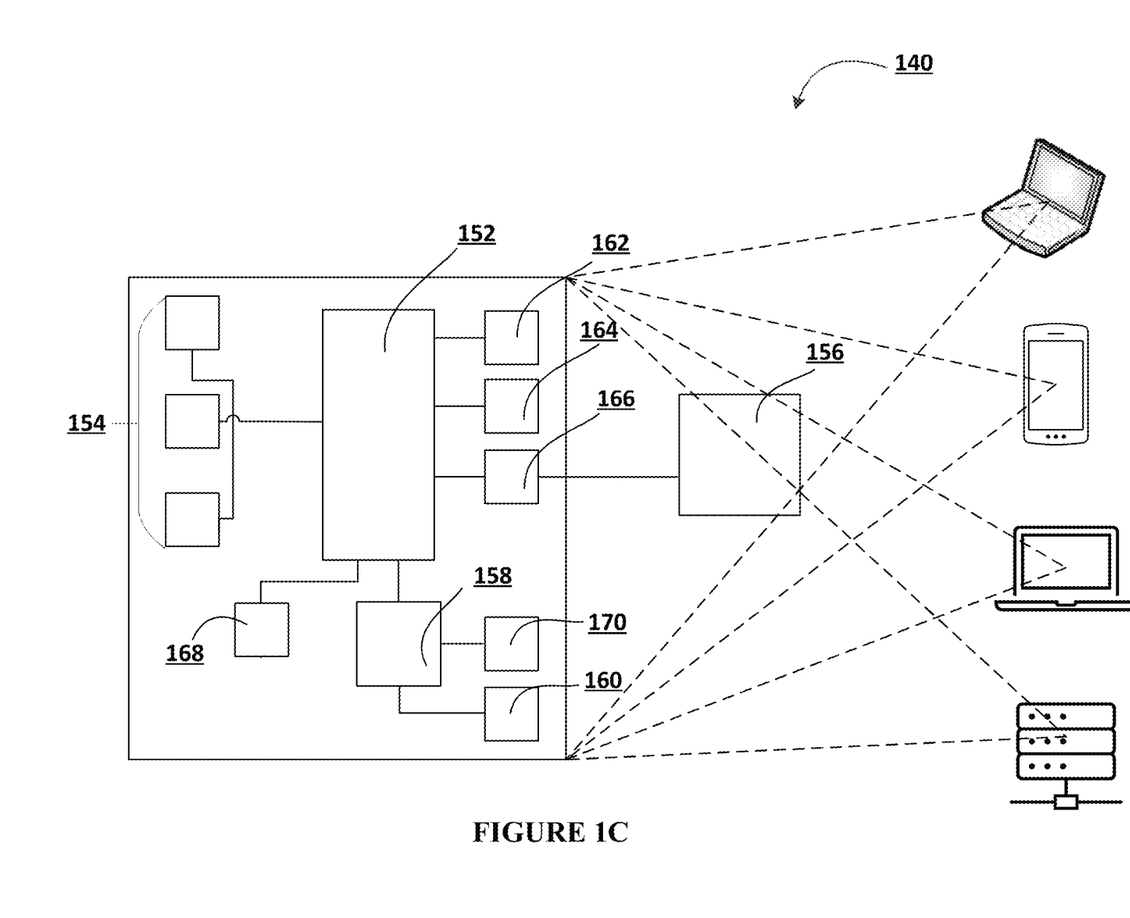

FIGS. 1A-1C illustrate technical components of an exemplary distributed computing environment for augmented hash-based portioning of non-fungible electronic resources for detection of unauthorized duplicates 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

Figure 2A:
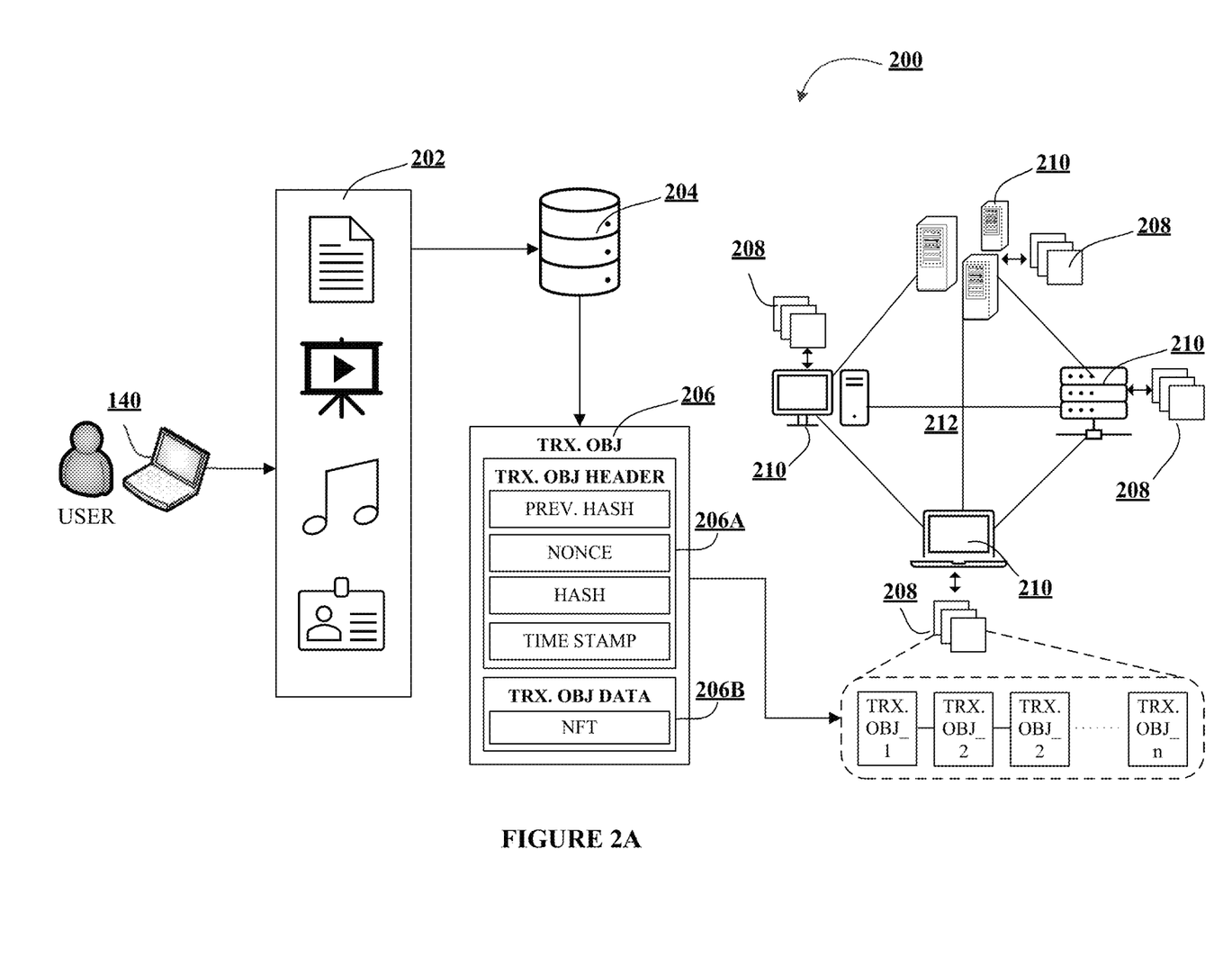
FIG. 2A illustrates an exemplary process of creating an NFT, in accordance with an embodiment of the invention.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

Figure 2B:
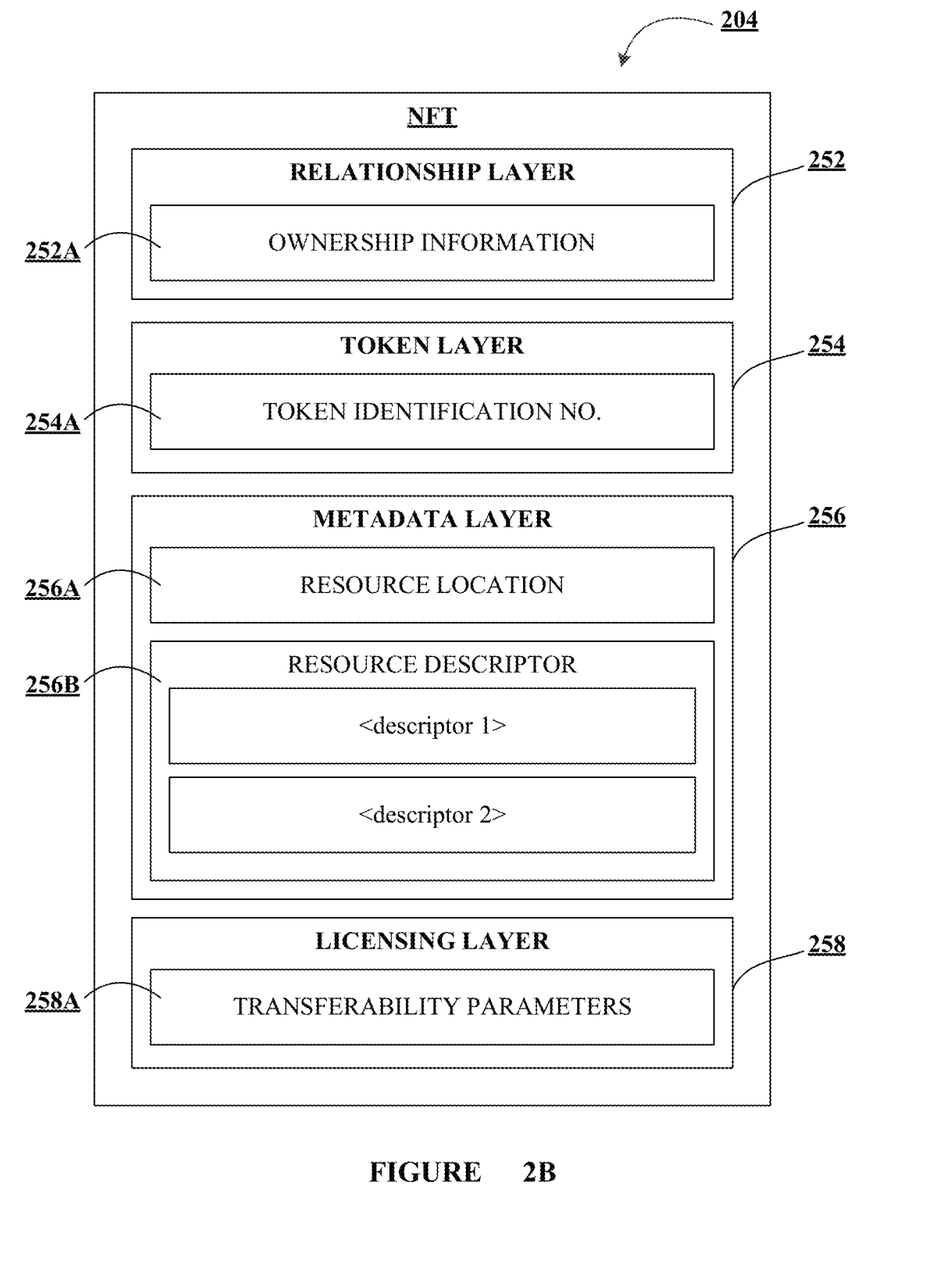
FIG. 2B illustrates an exemplary NFT as a multi-layered documentation of a resource, in accordance with an embodiment of an invention.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller Si, the relationship between B1 and Si as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

Figure 3:
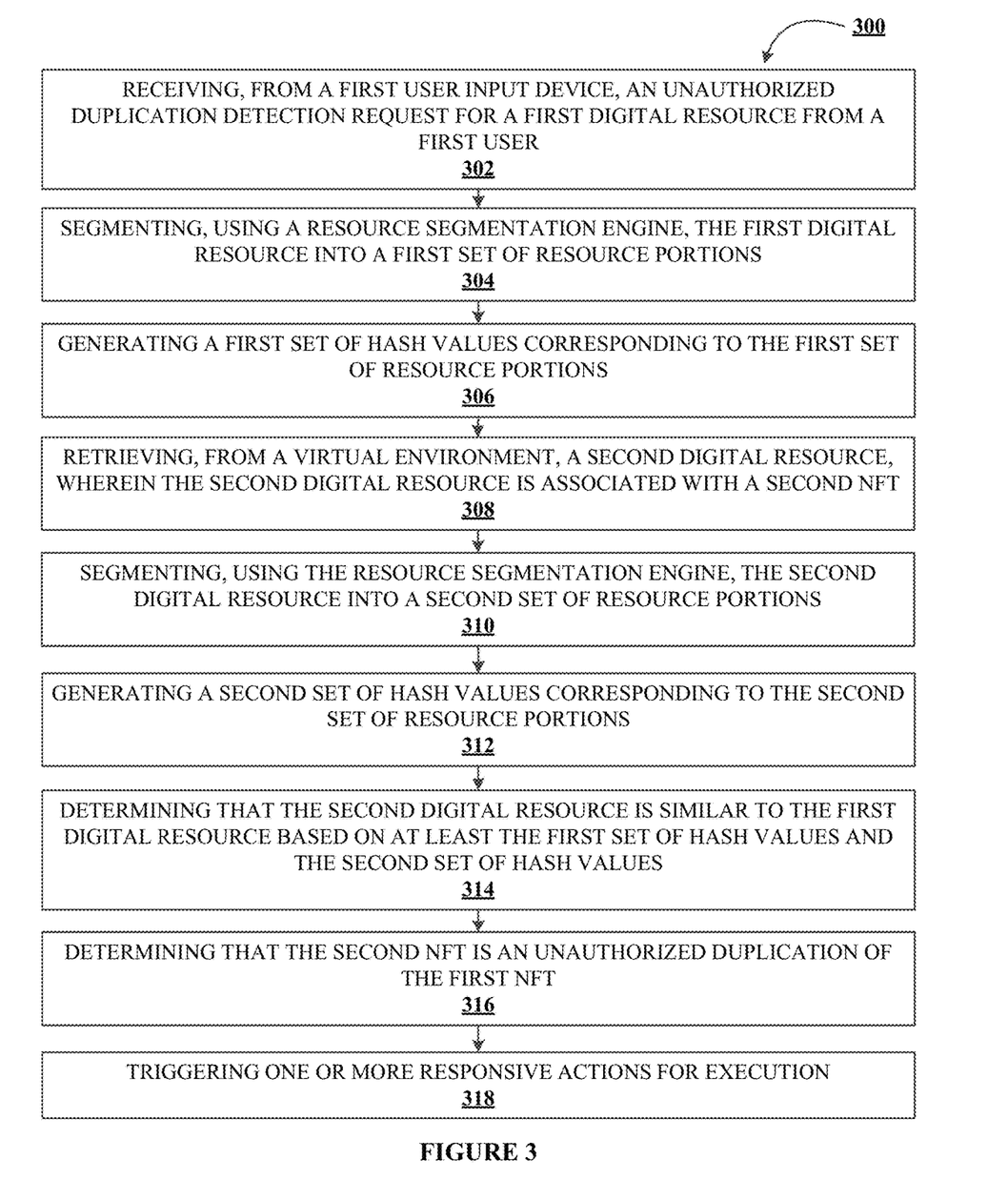
FIG. 3 illustrates a process flow for augmented hash-based portioning of non-fungible electronic resources for detection of unauthorized duplicates, in accordance with an embodiment of the invention.

FIG. 3 illustrates a process flow for augmented hash-based portioning of non-fungible electronic resources for detection of unauthorized duplicates 300, in accordance with an embodiment of the invention. As shown in block 302, the process flow includes receiving, from a first user input device, an unauthorized duplication detection request for a first non-fungible token (NFT) from a first user. In some embodiments, the first NFT is associated with a first digital resource, and the first user may be an owner of the first NFT.

Next, as shown in block 304, the process flow includes segmenting, using a resource segmentation engine, the first digital resource into a first set of resource portions. In some embodiments, segmenting the first digital resource may include overlaying, using the resource segmentation engine, a first bounding segment pattern on the first digital resource. By overlaying the first bounding segment pattern on the first digital resource, the system may be configured to generate the first set of resource portions for the first digital resource.

Bounding segments may be used to divide the digital resource into multiple portions. Each bounding segment may be configured to circumscribe the digital resource within a predetermined boundary prescribed by that bounding segment. By implementing multiple such bounding segments on the digital resource, the resource segmentation engine may be configured to segment the digital resource into various portions. The type of bounding segments used may vary depending on the type of the digital resource being analyzed. In one example, if the digital resource is a two-dimensional digital art, the bounding segments may be two-dimensional polygons, e.g., triangles, rectangles, square, and/or the like, two-dimensional ellipses, e.g., circle, oval, and/or the like, or any other two-dimensional shape that is capable of establishing a boundary to partition the digital art. In another example, if the digital resource is a time series, e.g., a piece of music, the bounding segments may be a starting point and an ending point that establishes a boundary in the time series.

A bounding segment pattern may be a specific combination of bounding segments that is used to partition the digital resource. The pattern may be established based not only on the combination of various shapes and sizes of the bounding segments used, but also on each bounding segment's location on the digital resource. For example, a bounding segment pattern may be a combination of a 2" circle, 4" a square, and a 2" equilateral triangle, where the 2" circle is positioned in the top-left corner of the digital art, the 4" square is positioned on the center of the digital art, and the 2" equilateral triangle is positioned in the bottom-right of the digital art. In some embodiments, the bounding segments in the bounding segment pattern may overlap. In some other embodiments, the bounding segments in the bounding segment pattern may not overlap.

Next, as shown in block 306, the process flow includes generating a first set of hash values corresponding to the first set of resource portions. For each portion, the system may be configured to generate a hash value. A hash value may be a numeric value of a fixed length that uniquely identifies the portion. Thus, when a hash value is generated for a portion, the contents of that portion of the digital resource are processed using a cryptographic algorithm, and a unique numerical value—the hash value—is produced that identifies the contents of that portion. If the portion is modified in any way, the value of the hash will also change significantly. Thus, the first set of hash values for the first set of resource portions may be arranged as an array of hash values, where each hash value in the array represents a particular bounded segment of the first digital resource.

Next, as shown in block 308, the process flow includes retrieving, from a virtual environment, a second digital resource, wherein the second digital resource is associated with a second NFT. To detect unauthorized duplicates of the first digital resource, the system may be configured to identify other digital resources in the virtual environment that are of the same type as that of the first digital resource. To begin the process of detecting unauthorized duplicates, the system may be configured to retrieve the second digital resource from the virtual environment. Here, the second digital resource may have the same type as that of the first digital resource. For example, if the first digital resource is digital art, the second digital resource is also digital art.

Next, as shown in block 310, the process flow includes segmenting, using the resource segmentation engine, the second digital resource into a second set of resource portions. In some embodiments, segmenting the second digital resource may include overlaying, using the resource segmentation engine, the first bounding segment pattern on the second digital resource. By overlaying the first bounding segment pattern on the second digital resource, the system may be configured to generate the second set of resource portions for the second digital resource.

Next, as shown in block 312, the process flow includes generating a second set of hash values corresponding to the second set of resource portions. Similar to the first set of hash values, the second set of hash values for the second set of resource portions may be arranged as an array of hash values, where each hash value in the array represents a particular bounded segment of the second digital resource.

Next, as shown in block 314, the process flow includes determining that the second digital resource is similar to the first digital resource based on at least the first set of hash values and the second set of hash values. To this end, the system may be configured to compare the first set of hash values and the second set of hash values. As described herein, the first set of hash values are unique identifiers for specific portions of the first digital resource, and the second set of hash values are unique identifiers for specific portions of the second digital resource. If any of these hash values match, it is an indication that the second digital resource has portions that are identical to the first digital resource. If multiple hash values match, it is an indication that the second digital resource has multiple portions that are identical to the first digital resource and is likely similar to the first digital resource.

Next, as shown in block 316, the process flow includes determining that the second NFT is an unauthorized duplication of the first NFT. In this regard, the system may be configured to determine one or more conditional requirements associated with the minting of the first NFT. These conditional requirements may be defined by the original seller when minting the first NFT and offering the first NFT for sale. One such conditional requirement may be a number of NFTs minted for that particular digital resource. Then, the system may be configured to determine that the second NFT does not meet the one or more conditional requirements. In response, the system may be configured to determine that the second NFT is an unauthorized duplication of the first NFT.

For example, one of the conditional requirements offered by the seller indicates that only one NFT is going to be minted for a particular digital resource. Thus, when the second digital resource is determined to be similar to that of the first digital resource, it is an indication that a conditional requirement associated with the minting of the first NFT has been violated by the existence of the second NFT. Therefore, the second NFT is the unauthorized duplication of the first NFT.

Next, as shown in block 318, the process flow includes triggering one or more responsive actions for execution in response to determining that the second NFT is an unauthorized duplication of the first NFT. In some embodiments, triggering the one or more responsive actions for execution may include generating an alert notification indicating that the second NFT is the unauthorized duplication of the first NFT. In one aspect, in response to generating the alert notification, the system may be configured transmit the alert notification to the owner of the first NFT, the owner of the second NFT, and the administrator of the virtual environment where the second NFT resides. The owner of the second NFT may be determined from the relationship layer of the second NFT.

In some embodiments, the system may be configured to execute the unauthorized duplication detection request simultaneously on multiple digital resources simultaneously. In this way, the system may be configured to scan the virtual environment (e.g., metaverse) for digital resources that are same or similar to the first digital resource. In one aspect, the system may be configured to continuously scan the virtual environment. In another aspect, the system may be configured to periodically scan the virtual environment. In some other aspect, the system may be configured to initiate the scan of the virtual in response to a triggering action, such as an NFT dump.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for augmented hash-based portioning of non-fungible electronic resources for detection of unauthorized duplicates, the system comprising:
   a processor;
   a non-transitory storage device containing instructions that, when executed by the processor, cause the processor to:
   receive, from a first user input device, an unauthorized duplication detection request for a first non-fungible token (NFT) from a first user, wherein the first NFT is associated with a first digital resource, wherein the first user is an owner of the first NFT;
   segment, using a resource segmentation engine, the first digital resource into a first set of resource portions, wherein segmenting the first digital resource further comprises:
   overlaying a first bounding segment pattern on the first digital resource, wherein the first bounding segment patterns overlap with one another; and
   generating the first set of resource portions for the first digital resource based on at least overlaying the first bounding segment pattern on the first digital resource;
   generate a first set of hash values corresponding to the first set of resource portions;
   retrieve, from a virtual environment, a second digital resource, wherein the second digital resource is associated with a second NFT;
   segment, using the resource segmentation engine, the second digital resource into a second set of resource portions;
   generate a second set of hash values corresponding to the second set of resource portions;
   determine that the second digital resource is similar to the first digital resource based on at least the first set of hash values and the second set of hash values;
   determine that the second NFT is an unauthorized duplication of the first NFT; and
   trigger one or more responsive actions for execution in response to determining that the second NFT is an unauthorized duplication of the first NFT.

2. The system of claim 1, wherein segmenting the second digital resource further comprises:
   overlaying, using the resource segmentation engine, the first bounding segment pattern on the second digital resource the one or more predetermined bounding segments on the second digital resource; and
   generating the second set of resource portions for the second digital resource based on at least overlaying the first bounding segment pattern on the second digital resource.

3. The system of claim 1, wherein determining that the second digital resource is similar to the first digital resource further comprises:
   comparing the first set of hash values and the second set of hash values;
   determining a match between the first set of hash values and the second set of hash values; and
   determining that the second digital resource is similar to the first digital resource.

4. The system of claim 1, wherein determining that the second NFT is the unauthorized duplication of the first NFT further comprises:
   determining one or more conditional requirements associated with a minting of the first NFT;
   determining that the second NFT does not meet the one or more conditional requirements; and
   determining that the second NFT is the unauthorized duplication of the first NFT based on at least determining that the second NFT does not meet the one or more conditional requirements.

5. The system of claim 1, wherein triggering the one or more responsive actions for execution further comprises generating an alert notification, wherein the alert notification comprises an indication that the second NFT is the unauthorized duplication of the first NFT.

6. The system of claim 5, wherein the instructions, when executed, further cause the processor to:
   transmit control signals configured to cause the first user input device to display the alert notification.

7. The system of claim 5, wherein the instructions, when executed, further cause the processor to:
   retrieve, from a relationship layer of the second NFT, ownership information associated with the second NFT;
   determine, from the ownership information, that a second user is an owner of the second NFT, wherein the second user is associated with a second user input device; and
   transmit control signals configured to cause the second user input device to display the alert notification.

8. The system of claim 5, wherein the instructions, when executed, further cause the processor to:
   transmit control signals configured to cause a user input device associated with an administrator of the virtual environment to display the alert notification.

9. A computer program product for augmented hash-based portioning of non-fungible electronic resources for detection of unauthorized duplicates, the computer program product comprising a non-transitory computer-readable medium comprising code causing an apparatus to:
   receive, from a first user input device, an unauthorized duplication detection request for a first non-fungible token (NFT) from a first user, wherein the first NFT is associated with a first digital resource, wherein the first user is an owner of the first NFT;
   segment, using a resource segmentation engine, the first digital resource into a first set of resource portions, wherein segmenting the first digital resource further comprises:
   overlaying a first bounding segment pattern on the first digital resource, wherein the first bounding segment patterns overlap with one another; and generating the first set of resource portions for the first digital resource based on at least overlaying the first bounding segment pattern on the first digital resource;
generate a first set of hash values corresponding to the first set of resource portions;
retrieve, from a virtual environment, a second digital resource, wherein the second digital resource is associated with a second NFT;
segment, using the resource segmentation engine, the second digital resource into a second set of resource portions;
generate a second set of hash values corresponding to the second set of resource portions;
determine that the second digital resource is similar to the first digital resource based on at least the first set of hash values and the second set of hash values;
determine that the second NFT is an unauthorized duplication of the first NFT; and
trigger one or more responsive actions for execution in response to determining that the second NFT is an unauthorized duplication of the first NFT.

10. The computer program product of claim 9, wherein segmenting the second digital resource further comprises:
overlaying, using the resource segmentation engine, the first bounding segment pattern on the second digital resource the one or more predetermined bounding segments on the second digital resource; and
generating the second set of resource portions for the second digital resource based on at least overlaying the first bounding segment pattern on the second digital resource.

11. The computer program product of claim 9, wherein determining that the second digital resource is similar to the first digital resource further comprises:
comparing the first set of hash values and the second set of hash values;
determining a match between the first set of hash values and the second set of hash values; and
determining that the second digital resource is similar to the first digital resource.

12. The computer program product of claim 10, wherein determining that the second NFT is the unauthorized duplication of the first NFT further comprises:
determining one or more conditional requirements associated with a minting of the first NFT;
determining that the second NFT does not meet the one or more conditional requirements; and
determining that the second NFT is the unauthorized duplication of the first NFT based on at least determining that the second NFT does not meet the one or more conditional requirements.

13. The computer program product of claim 9, wherein triggering the one or more responsive actions for execution further comprises generating an alert notification, wherein the alert notification comprises an indication that the second NFT is the unauthorized duplication of the first NFT.

14. The computer program product of claim 13, wherein the code causes further the apparatus to:
transmit control signals configured to cause the first user input device to display the alert notification.

15. The computer program product of claim 13, wherein the code causes further the apparatus to:
retrieve, from a relationship layer of the second NFT, ownership information associated with the second NFT;
determine, from the ownership information, that a second user is an owner of the second NFT, wherein the second user is associated with a second user input device; and
transmit control signals configured to cause the second user input device to display the alert notification.

16. The computer program product of claim 13, wherein the code causes further the apparatus to:
transmit control signals configured to cause a user input device associated with an administrator of the virtual environment to display the alert notification.

17. A method for augmented hash-based portioning of non-fungible electronic resources for detection of unauthorized duplicates, the method comprising:
receiving, from a first user input device, an unauthorized duplication detection request for a first non-fungible token (NFT) from a first user, wherein the first NFT is associated with a first digital resource, wherein the first user is an owner of the first NFT;
segmenting, using a resource segmentation engine, the first digital resource into a first set of resource portions, wherein segmenting the first digital resource further comprises:
overlaying a first bounding segment pattern on the first digital resource, wherein the first bounding segment patterns overlap with one another; and
generating the first set of resource portions for the first digital resource based on at least overlaying the first bounding segment pattern on the first digital resource;
generating a first set of hash values corresponding to the first set of resource portions;
retrieving, from a virtual environment, a second digital resource, wherein the second digital resource is associated with a second NFT;
segmenting, using the resource segmentation engine, the second digital resource into a second set of resource portions;
generating a second set of hash values corresponding to the second set of resource portions;
determining that the second digital resource is similar to the first digital resource based on at least the first set of hash values and the second set of hash values;
determining that the second NFT is an unauthorized duplication of the first NFT; and
triggering one or more responsive actions for execution in response to determining that the second NFT is an unauthorized duplication of the first NFT.

18. The method of claim 17, wherein segmenting the second digital resource further comprises:
overlaying, using the resource segmentation engine, the first bounding segment pattern on the second digital resource the one or more predetermined bounding segments on the second digital resource; and
generating the second set of resource portions for the second digital resource based on at least overlaying the first bounding segment pattern on the second digital resource.

19. The method of claim 17, wherein determining that the second digital resource is similar to the first digital resource further comprises:
comparing the first set of hash values and the second set of hash values;
determining a match between the first set of hash values and the second set of hash values; and
determining that the second digital resource is similar to the first digital resource.

20. The method of claim 17, wherein determining that the second NFT is the unauthorized duplication of the first NFT further comprises:
- determining one or more conditional requirements associated with a minting of the first NFT;
- determining that the second NFT does not meet the one or more conditional requirements; and
- determining that the second NFT is the unauthorized duplication of the first NFT based on at least determining that the second NFT does not meet the one or more conditional requirements.

* * * * *